United States Patent [19]

van Dorsselaer

[11] Patent Number: 4,796,094
[45] Date of Patent: Jan. 3, 1989

[54] METHOD FOR RECONSTRUCTING A DITHER MATRIX

[75] Inventor: Etienne L. M. E. van Dorsselaer, Sintjansteen, Netherlands

[73] Assignee: OCE-Nederland B.V., Venlo, Netherlands

[21] Appl. No.: 113,889

[22] Filed: Oct. 27, 1987

[30] Foreign Application Priority Data

Oct. 29, 1986 [NL] Netherlands ............... 8602712

[51] Int. Cl.$^4$ ............................................. H04N 1/40
[52] U.S. Cl. ...................................... 358/283; 358/298
[58] Field of Search ................... 358/283, 298, 280; 364/602

[56] References Cited

U.S. PATENT DOCUMENTS 4,651,293 3/1987 Kato .................................. 358/280

Primary Examiner—James J. Groody
Assistant Examiner—David E. Harvey
Attorney, Agent, or Firm—Reed Smith Shaw & McClay

[57] ABSTRACT

The invention provides a method for reconstructing a dither matrix, used to transform a rastered gray-level image into an image of binary pixels, from the dithered image. The method includes the steps of determining the dimensions of the dither matrix from the spatial frequencies present in the dithered image and then determining the threshold values of the dither matrix from the distribution function of the pixels having a specific value.

5 Claims, 4 Drawing Sheets

| 1 | 13 | 41 | 61 | 64 | 44 | 16 | 4 |
| 9 | 21 | 49 | 55 | 54 | 52 | 24 | 12 |
| 25 | 33 | 39 | 31 | 30 | 38 | 36 | 28 |
| 57 | 47 | 19 | 7 | 6 | 18 | 46 | 60 |
| 63 | 43 | 15 | 3 | 2 | 14 | 42 | 62 |
| 53 | 51 | 23 | 11 | 10 | 22 | 50 | 56 |
| 29 | 37 | 35 | 27 | 26 | 34 | 40 | 32 |
| 5 | 17 | 45 | 59 | 58 | 48 | 20 | 8 |

| 29486 | 20510 | 8014  | 1297  | 266   | 7438  | 18401 | 26336 |
|-------|-------|-------|-------|-------|-------|-------|-------|
| 22555 | 13283 | 6270  | 4333  | 4672  | 5327  | 11855 | 20974 |
| 11524 | 9660  | 8439  | 10124 | 10309 | 8642  | 9009  | 10772 |
| 3452  | 6837  | 14782 | 23991 | 24670 | 16081 | 7024  | 1924  |
| 539   | 7722  | 19463 | 27338 | 28319 | 19936 | 7825  | 911   |
| 5103  | 5643  | 12270 | 21509 | 21995 | 12746 | 5926  | 3863  |
| 10567 | 8887  | 9240  | 11074 | 11266 | 9403  | 8216  | 9868  |
| 25494 | 17433 | 7236  | 2562  | 2993  | 6537  | 14027 | 23210 |

FIG. 4

| 1 | 13 | 41 | 61 | 64 | 44 | 16 | 4 |
|---|---|---|---|---|---|---|---|
| 9 | 21 | 49 | 55 | 54 | 52 | 24 | 12 |
| 25 | 33 | 39 | 31 | 30 | 38 | 36 | 28 |
| 57 | 47 | 19 | 7 | 6 | 18 | 46 | 60 |
| 63 | 43 | 15 | 3 | 2 | 14 | 42 | 62 |
| 53 | 51 | 23 | 11 | 10 | 22 | 50 | 56 |
| 29 | 37 | 35 | 27 | 26 | 34 | 40 | 32 |
| 5 | 17 | 45 | 59 | 58 | 48 | 20 | 8 |

FIG. 5

METHOD FOR RECONSTRUCTING A DITHER MATRIX

FIELD OF THE INVENTION

The invention relates to a method for reconstructing from a dithered image in digital form, the dither matrix used to generate the dithered image from an original, analog image.

BACKGROUND OF THE INVENTION

In the dithering of an image, the image is divided up into a raster of image elements and the gray level of each of the image elements is determined by suitable means, see, for example, Display of Dithered Images, Proceeding of the SID, Vol. 22, No. 3, p. 185-190 (1981) which describes a method for deriving a gray-level image from its dithered version. The raster is then divided up into adjacent areas of equal size and the gray levels of the image elements in each area are compared with a dither matrix fitting on that area and consisting of a configuration of thresholds. If the gray level of an image element is greater than or equal to the corresponding threshold, that image element is given a first logic value ("1") while in the other case the image element is given the other logic value ("0"). The result of this process is a translation of the raster of gray levels into a raster of two-value pixels. These dither methods are well known in the prior art. See, for example, *A Survey Of Electronic Techniques For Pictorial Image Reproduction*, IEEE Transaction On Communications, Vol. COM-29, No. 12, 1898-1925 and U.S. Pat. No. 3,967,052.

Dither methods of this kind can be used to transmit image information over digital transmission lines, for example in facsimile applications, for example, German Offenlegungsschrift D.E. No. 33 44 694 A1 which describes a method for recognizing and displaying gray level image sections in a digital fax image. Dither methods can also be used to print images by means of printers which are only capable of (or suitable for) printing picture points having a single black level.

It is often desirable to perform other operations on dithered images, e.g., enlargement or reduction of the image or a part thereof. Enlargement or reduction may be desirable from the user's standpoint, while on the other hand, it may be necessary, for example, if different printers with different resolutions are used for making prints having the same format. Frequently, it is necessary to have information concerning the dither matrix with which the original image was dithered. In many cases, however, the dither matrix is unknown. Accordingly, it is an object of the present invention to provide a method for reconstructing the matrix used to generate the dither information from the available digital dither information of an image.

SUMMARY OF THE INVENTION

Generally, the present invention provides a method having the following steps:

a. determining from the dithered image a period m, where m is the main spatial frequency in the row direction of the image, and a period n, where n is the main spatial frequency in the column direction of the dithered image;

b. determining the dimensions, in pixels, of the dither matrix to be reconstructed, by equating the row dimension to m and by equating the column dimension to n;

c. dividing the dithered image into adjacent areas of $m \times n$ pixels;

d. counting, for each given pixel position in the dither matrix to be reconstructed, the number of pixels having a specific value in those positions in the areas specified in step (c) which correspond to the given pixel position in the dither matrix to be reconstructed, and compiling a distribution function of the counted pixels as a function of the position in the dither matrix to be reconstructed; and e. allocating a threshold value to each position in the dither matrix to be reconstructed, based on the value of the distribution function in that position.

The method of the present invention is based, on the one hand, on the understanding that by means of autocorrelation functions, for example, it is possible to determine a periodicity in both the row direction and the column direction in the total dithered image. This periodicity originates in the dithering of the original image by means of the matrix into a regular pattern and, thus, the periodicity can provide conclusions regarding the width and height in pixels of the dither matrix. See generally, Japanese patent application No. 57-222756.

On the other hand, the invention is based on the understanding that an average image will contain all (or at least a sufficient number of) gray levels so that each threshold of the dither matrix will be confronted by a large number of different gray levels distributed over the entire scale between black and white. It can also generally be stated that points having a lower threshold will give rise to the threshold being exceeded during the dithering of an image more frequently than points having a higher threshold. Thus, if a distribution function is determined by adding together the values of all the corresponding pixels which are compared with the same gray threshold during dithering, there is a very high probability that the pixels associated with the lowest threshold will give the highest sum, while the pixels belonging to the highest threshold will give the lowest sum. In other words, the threshold associated with a given position in the dither matrix can be determined from the value of the distribution function associated with that position.

According to a presently preferred embodiment of the invention, a set of unique thresholds of consecutive levels is allocated in step (e) to the positions in the probable dither matrix in the sequence given by increasing values of the distribution function. This preferred embodiment is based on the experience that dither matrices frequently consist of a collection of unique thresholds distributed uniformly over all the gray levels between white and black.

If the original dither matrix was a matrix of this kind, then the method according to the invention will yield a dither matrix exactly equal to the original matrix. Even if the original dither matrix was not of the above described type, e.g., a matrix in which all the thresholds occur twice, the method will yield a dither matrix which provides a very good approximation of the original matrix.

Other characteristics and advantages of the present invention will become apparent from the following detailed description of presently preferred embodiments taken in connection with the accompanying drawings.

BRIEF DESCRIPTION OF THE DRAWINGS

FIG. 4 shows the distribution function of black pixels over the positions in the probable dither matrix; and FIG. 5 shows the reconstructed dither matrix.

PRESENTLY PREFERRED EMBODIMENT

Figure 1:
FIG. 1 is a dithered image of a photograph.

Referring to FIG. 1 an illustration of a dithered image of a photograph on the IEEE standard 167A-1980 Facsimile Test Chart is shown. It was obtained by dithering the photograph with the dither matrix shown in FIG. 2. This image is made up of 1520 rows in 1320 columns of pixels. The value of the pixel at the point of intersection of the $i^{th}$ row and the $j^{th}$ column is given by p (i, j) and is 0 for white pixels and 1 for black pixels.

In the reconstruction of the original dither matrix from the values p (i, j), the dimensions of that dither matrix expressed in numbers of pixels are first determined. This is done by an auto-correlation process in which the values of pixels p (i, j) are compared with the values of the pixels of the same image after shifting over a number of pixels $\tau$.

This can be represented by the following equation:
in the case of shifting in the row direction over $\tau_r$ pixels:

$$R(\tau_r) = \frac{1}{n \cdot (m - \tau_r)} \sum_{i=1}^{n} \sum_{j=\tau_r+1}^{m} p(i,j) * p(i, j - \tau_r)$$

and in the case of shifting in the column direction over $\tau_k$ pixels:

$$R(\tau_k) = \frac{1}{(n - \tau_k) \cdot m} \sum_{j=1}^{m} \sum_{i=1+\tau_k}^{n} p(i,j) * p(i - \tau_k, j)$$

where $p(i,j) * p(k,l)$ = 1 when $p(i,j) = 1$ as well as
$p(k,l) = 1$ and when
$p(i,j) = 0$ as well as
$p(k,l) = 0$
= 0 in all other cases.

This process is generally very suitable for the recognition of periodic patterns and with a dithered image of the kind shown in FIG. 1. It directly yields the dimension of the dither matrix used in the direction of displacement. The original dither process with the same dither matrix in every case has created a fixed raster pattern in the image.

Figures 2, 3:
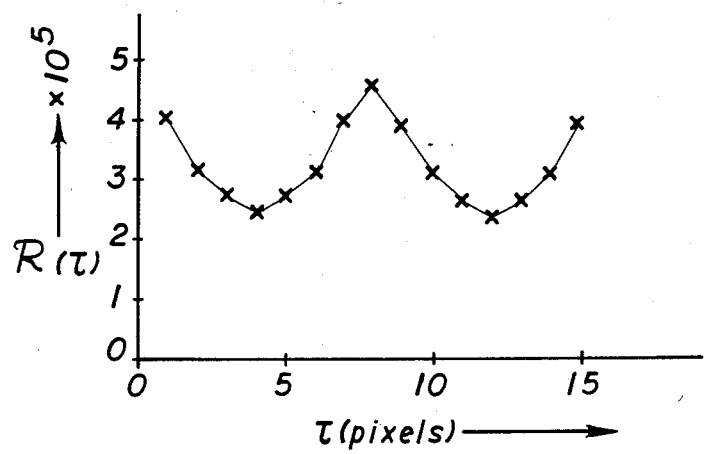
FIG. 2 is the dither matrix used in the dithering of the photograph represented in FIG. 1.
FIG. 3 shows the effect of an auto-correlation processing in one direction on the dithered image.

With respect to FIG. 3 the result is shown of the auto-correlation function $R(\tau_r)$ in the row direction as a function of the shift $\tau_r$, of the image of FIG. 1. In order to save computing time, only one-quarter of the image is analyzed (660×760 pixels top left). This is quite sufficient for a reliable analysis. The graph illustrated in FIG. 3 has a maximum value at $\tau_r = 8$, from whichit follows that the main spatial frequency in the row direction has a period of 8 pixels. From this it is possible to conclude that the dither matrix used has a width of 8 pixels. An auto-correlation process in the column direction (not shown here) of the image in FIG. 1 gives the height of the dither matrix used, which in this example is also 8 pixels.

After determining the dimensions of the dither matrix, the level of the thresholds is determined. To this end the dithered image is divided into adjacent areas having the same dimensions as those of the dither matrix determined hereinbefore, i.e., 8×8 pixels. A table is then compiled with as many boxes as there are positions in the dither matrix so that each box in the table corresponds to a given position in the dither matrix. The black pixels are then counted on that pixel position in the adjacent areas which corresponds to a given position in the dither matrix, and the number counted is noted in that box in the table which corresponds to that position in the dither matrix. The entire table is filled in this way. The full table can be regarded as a distribution function of black pixels over the positions in the dither matrix, which is shown in FIG. 4.

Starting from the hypothesis that the original dither matrix consists of a set of unique thresholds, the levels of which are distributed uniformly over the entire scale of gray levels between white and black, as many thresholds as there are positions in the dither matrix, 8×8=64 in the example. Hence, the thresholds 1, 2, 3 up to and including 64, are then filled in in the positions of the probable dither matrix in accordance with the distribution function.

The position where the distribution function has the maximum value is given a threshold of 1, and the position where the distribution function has the next highest value is given a threshold of 2, and so on. The result is shown in FIG. 5. The reconstructed dither matrix in FIG. 5 will be seen to correspond completely to the original dither matrix represented in FIG. 2.

In this example, the complete dithered image is used in counting black pixels. However, the count can also be carried out in a representative part of the image, e.g., to save processing time. This may result in a decline in the accuracy of the operation and the reconstructed dither matrix may deviate from the original matrix. As a rule, however, this will result in only slight differences which do not appreciably affect the result of an image processing operation using knowledge of the reconstructed dither matrix.

Dither matrices in which all the thresholds occur several times are sometimes used. In that case too, the method according to the invention gives good results. Although no equal thresholds will occur in the reconstructed matrix, thresholds which were equal in the original matrix will now have consecutive, i.e., closely situated, levels, so that the differences between the original and the reconstructed dither matrix remains slight.

While a presently preferred embodiment of the invention has been described in particularity, the invention may be otherwise embodied within the scope of the appended claims.

What is claimed is:

1. A method of reconstructing a dither matrix from a dithered image dithered by said matrix comprising the steps of:
   a. determining (i) a period m, where m is the main spatial frequency in the row direction and (ii) a period n, where n is the main spatial frequency in the column direction of said dithered image;
   b. determining the dimensions in pixels of said dither matrix by equating the dimension in the row direction to m and equating the dimension in the column direction to n;

c. dividing the dithered image into adjacent areas of m×n pixels;

d. counting, for each given pixel position in the dither matrix to be reconstructed, the pixels having a specific value in those positions in the divided areas which correspond to the given pixel position in said dither matrix and compiling a distribution function of the counted pixels as a function of the position in said dither matrix; and e. allocating a threshold value to each position in the dither matrix to be reconstructed, based on the value of said distribution function in that position.

2. A method according to claim 1, wherein in step (e) a set of unique thresholds of consecutive levels is allocated to the positions in the dither matrix to be reconstructed in the sequence given by increasing values of the distribution function.

3. A method as set forth in claim 1, wherein the dimensions of the dither matrix, in pixels, is determined by auto-correlation.

4. A method as set forth in claim 3, wherein said auto-correlation consists of comparing pixel values in a specific row column location, shifting said dithered image $\tau$ pixels, and comparing the value of such pixels.

5. A method as set forth in claim 4, wherein said comparison is according to the pixel value R, where R in the case of shifting in the row direction over $\tau_r$ pixels:

$$R(\tau_r) = \frac{1}{n \cdot (m - \tau_r)} \sum_{i=1}^{n} \sum_{j=\tau_r+1}^{m} p(i,j) * p(i, j - \tau_r)$$

and in the case of shifting in the column direction over $\tau_k$ pixels:

$$R(\tau_k) = \frac{1}{(n - \tau_k) \cdot m} \sum_{j=1}^{m} \sum_{i=1+\tau_k}^{n} p(i,j) * p(i - \tau_k, j)$$

where $$\begin{aligned} p(i,j) * p(k,l) &= 1 \text{ when } p(i,j) = 1 \text{ as well as} \\ &\quad p(k,l) = 1 \text{ and when} \\ &\quad p(i,j) = 0 \text{ as well as} \\ &\quad p(k,l) = 0 \\ &= 0 \text{ in all other cases.} \end{aligned}$$

* * * * *